No. 691,005. Patented Jan. 14, 1902.
W. SCANTLEBURY, Sr.
ENGINE.
(Application filed Sept. 8, 1900.)
(No Model.) 3 Sheets—Sheet 2.
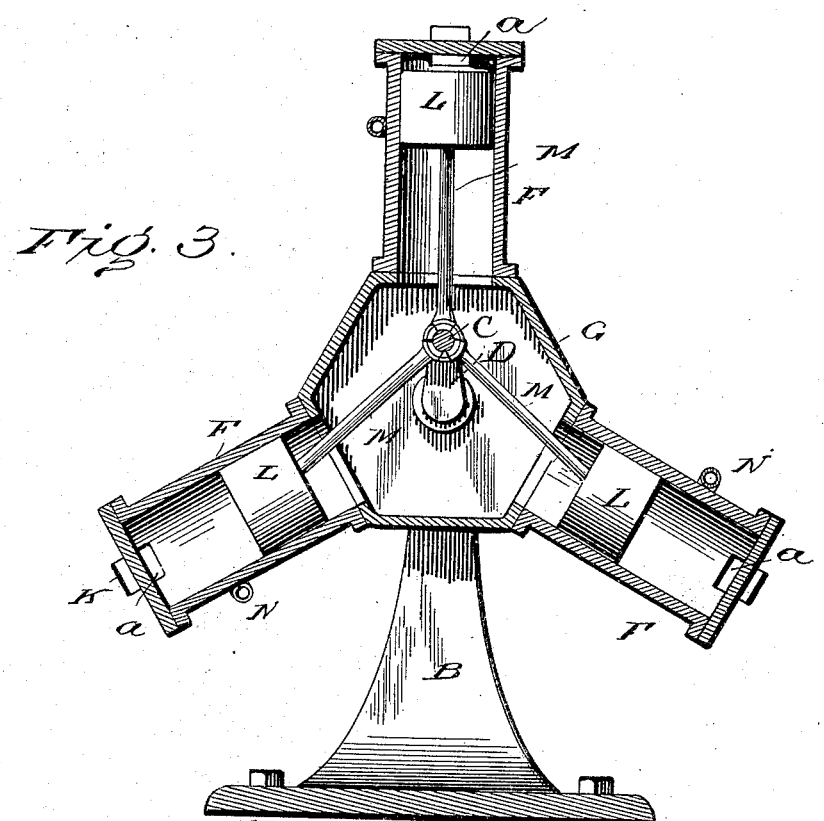
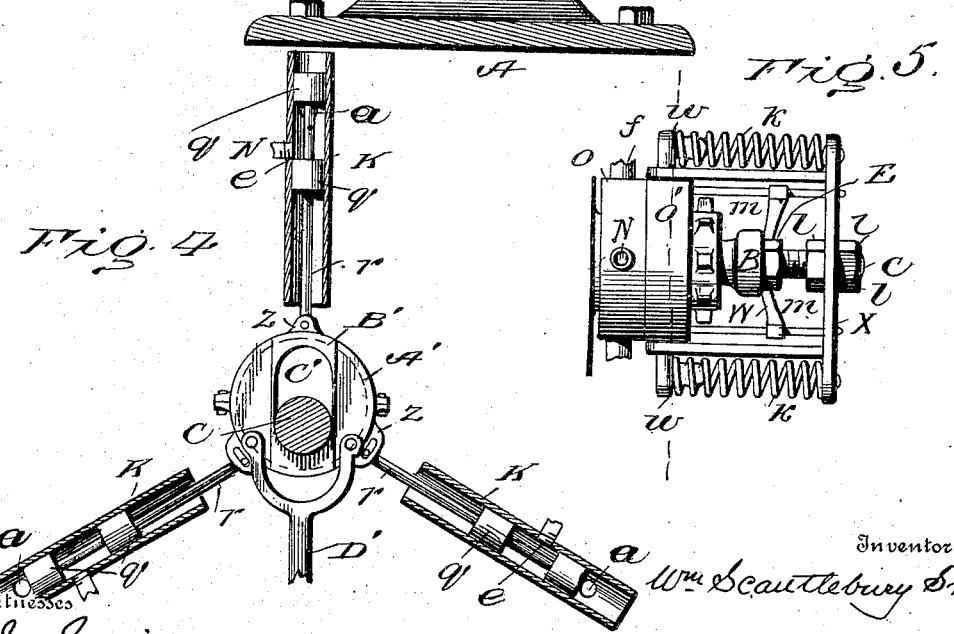

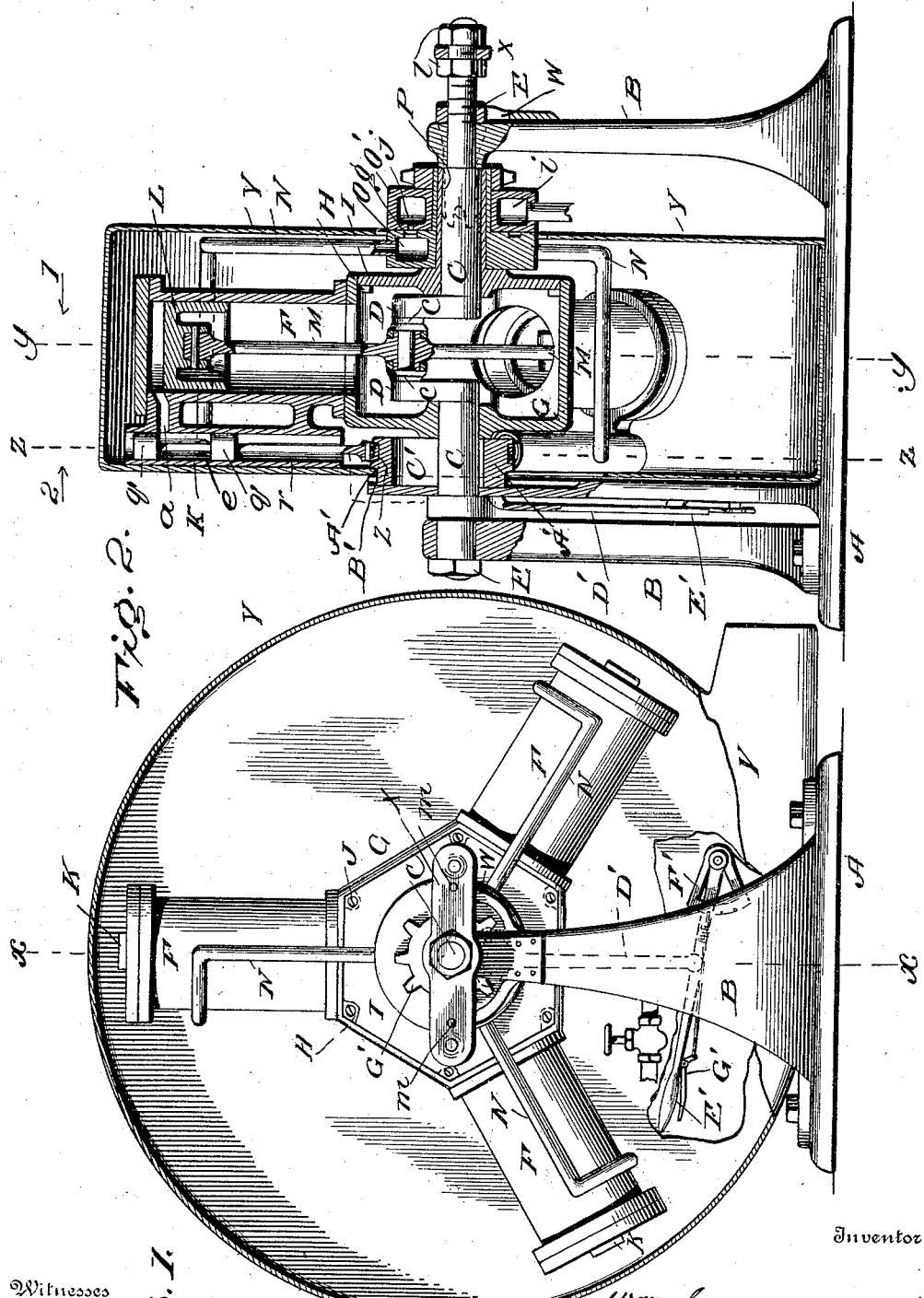

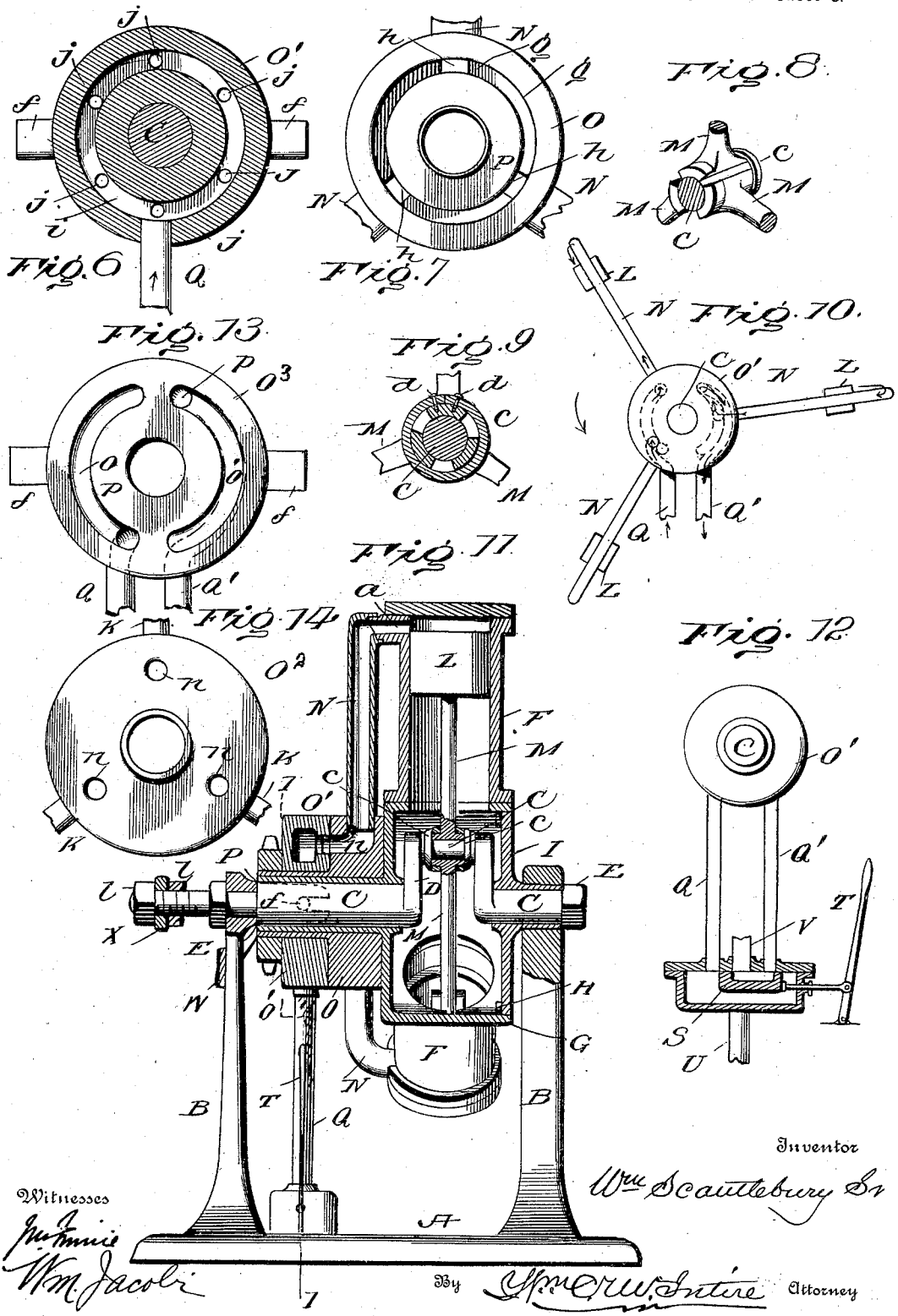

UNITED STATES PATENT OFFICE.

WILLIAM SCANTLEBURY, SR., OF WASHINGTON, DISTRICT OF COLUMBIA, ASSIGNOR, BY DIRECT AND MESNE ASSIGNMENTS, OF TWO-THIRDS TO R. BATHURST RIVES, OF WASHINGTON, DISTRICT OF COLUMBIA, AND J. J. RIVES, OF BALTIMORE, MARYLAND.

ENGINE.

SPECIFICATION forming part of Letters Patent No. 691,005, dated January 14, 1902.

Application filed September 8, 1900. Serial No. 29,458. (No model.)

*To all whom it may concern:*

Be it known that I, WILLIAM SCANTLEBURY, Sr., a citizen of the United States, residing at Washington, in the District of Columbia, have invented certain new and useful Improvements in Engines; and I do hereby declare the following to be a full, clear, and exact description of the invention, such as will enable others skilled in the art to which it appertains to make and use the same.

My invention relates to certain new and useful improvements in engines, and particularly to that class known as "rotary" engines; but I prefer to denominate my invention as a "reciprocating" rotary engine to differentiate it from the ordinary rotary engine.

My invention has for its object to utilize the steam expansively and with substantially the same degree of economy as that secured in ordinary reciprocating engines.

My invention has for a further object to dispense with all packing, which is always troublesome and more or less ineffective.

My invention has for a further object to produce an engine of a small number of parts and operative within a comparatively limited space or area, and consequently advantageously adapted for use in connection with automobiles and similar vehicles and economic of construction.

My invention has for a further object to provide a novel means for promptly reversing the engine.

With these ends in view my invention consists in the construction and arrangement of parts hereinafter fully described and as illustrated in the drawings.

In order that those skilled in the art to which my invention appertains may know how to make and use the same and appreciate all of its advantages, I will proceed to describe the construction and operation of my improved engine, referring by letters to the accompanying drawings, in which—

Figure 1 is a side elevation of one of my improved engines with the case or muffle-box shown in section. Fig. 2 is a vertical section taken on the line $x$ $x$ of Fig. 1. Fig. 3 is a central section taken on the line $y$ $y$ of Fig. 2 and looking in the direction of the arrow 1. Fig. 4 is a section taken on the line 2 2 and looking in the direction of the arrow 2. Fig. 5 is a detail top plan view showing the manner in which the two-part valve is arranged. Fig. 6 is a section on the line $w$ $w$ of Fig. 5. Fig. 7 is an outer face view of the inner section of the valve. Fig. 8 is a detail perspective section showing the stationary crank-shaft and showing the relation of the piston-rods thereto and with the securing-rings removed. Fig. 9 is a cross-section of the same and showing one of the securing-rings in place. Fig. 10 is a diagrammatic view, on reduced scale, showing the travel of the live steam and its exhaust. Fig. 11 is a vertical cross-section of the engine, showing a modified construction by means of which the use of an eccentric such as particularly shown in Figs. 1, 2, and 4 is rendered unnecessary. Fig. 12 is a detail view, partly in section and taken on the line 1 1 of Fig. 11, showing a form of valve employed in connection with the modified construction shown at Fig. 11 and utilized for reversing the engine. Fig. 13 is a view of that portion of the valve shown at Fig. 6 and indicating a modification by which the steam is admitted, and Fig. 14 is a face view of the part similar to Fig. 7 and showing the modification necessary to adapt it to use with the companion portion illustrated at Fig. 13.

Similar letters of reference indicate like parts in the several figures of the drawings.

A represents the bed-plate, which may be secured by bolts or otherwise to any suitable foundation or support.

B B are vertical pillars or shaft-supports erected upon the base A. The upper ends of the supports B are formed in any suitable manner with seats to receive and support a stationary shaft C, formed with a crank portion D. The shaft C is maintained in fixed relation with its seats in the pillars B in any suitable manner; but I have shown jam-nuts E for this purpose, threaded upon the projecting ends of the shaft, as clearly shown in Figs. 2 and 11.

F F F are three or more cylinders secured radially and equidistant to a central hub G, one end of which is cast open and with a flange H to receive a closing face-plate I, which is secured in place by screws J, as clearly shown in Fig. 1. The fixed and removable faces of the hub G are extended outwardly, as clearly shown in section at Figs. 2 and 11, to surround or embrace the fixed shaft C each side of the crank portion D, so that the cylinders and hub are free to rotate around said shaft. Each cylinder F is provided at its upper end with a lateral part $a$, leading into a longitudinal cylindrical steam-conduit K, open at both ends, and in which is arranged a reciprocating piston-valve, to be presently described. Within each cylinder F is arranged a piston-head L, connected by a pintle-joint, as clearly shown at Fig. 2, with a piston-rod M, the inner end of which is extended laterally to constitute a broad head bearing against the crank portion of the fixed shaft. These inner bearing-heads of the piston-rods are made concentric with the crank-shaft in order that they may freely rotate to a limited extent upon said shaft, and, as shown at Figs. 8 and 9, they each constitute a segment, with a space intervening between each to permit their necessary movement and no more. They are held in their proper relation to the shaft by rings $c$, which are secured in position by screws $d$, as clearly shown at Fig. 9, and which obviously rotate with the bearing-heads of the pistons, while at the same time the piston-heads are capable of rotative movement to a limited extent, as stated, independently of each other. The steam-conduits K are supplied with steam through pipes N, communicating at their outer ends with the interior steam-space of the said conduits, as shown at $e$, (see Fig. 4,) or steam may be introduced to the cylinders F directly from the pipes N, as will be hereinafter explained. The inner ends of said pipes N connect radially with the valve mechanism, which consists of two parts O and O'. The part O' surrounds the laterally-extended sleeve portion of the hub G and is itself formed with a projecting sleeve P, as clearly shown at Figs. 2 and 11, which sleeve constitutes the immediate bearing for the other portion O' of the valve, which latter is free to move longitudinally thereon and to also vibrate slightly upon its trunnions $f$, the purpose of which will be presently explained.

Q Q' are two steam-pipes connected at one end with the part O' of the valve and at the lower end with a steam-chest R, (see Fig. 12,) in which is arranged a slide-valve S, operated by a suitable lever T. The steam-chest is supplied by a pipe U and is formed with an exhaust V, and when the valve is in the position shown at Fig. 12 the pipe Q becomes the supply for live steam, while the pipe Q' leads to the exhaust, and when the valve is moved toward the left the conditions are reversed and the pipe Q' supplies the live steam, while the pipe Q leads to the exhaust, and consequently the engine may be reversed, as will be hereinafter explained.

Referring to Figs. 6 and 7, I will proceed to describe the details of the construction of the two parts O and O' of the valve mounted axially upon the fixed shaft C. The part O is formed with a circular groove or steam-channel $g$, communicating with intersecting parts $h$, leading to the several steam-pipes N. The other part O' of the valve is formed with an interior circular groove or steam-channel $i$, which is intersected by transverse orifices $j$, which extend through the working face of the portion O' and open into the circular steam-channel $g$ of the other portion O of the valve when the two parts are in working relation. The portion O' is formed with two diametric trunnions $f$, (before referred to,) which are supported within a longitudinal slot or bearing in the arms of a bracket W at the upper end of one of the pillars B. Each of the trunnions $f$ is formed with a horizontal radial lug or teat adapted to enter one end of a coil-spring $k$, the opposite end of which is entered by a similar teat extending horizontally from each end of an equalizing-bar X, slidably mounted upon the screw-threaded end of the shaft C and secured in position by nuts $l\ l$, through the medium of which and the bar X the tension of the springs $k$ may be adjusted. Guiding-pins $m$, extending from the bar X and through the bracket W, maintain the bar X in proper position relatively to the springs $k$ in an obvious manner. The springs $k$ and their relation with the trunnions on the portion O' of the valve and the manner in which said trunnions are supported permits the said portion O' to adapt itself at all times and under all conditions to the face of the adjacent portion O of the valve and to compensate for all wear between the parts. Recurring to the two parts of the valve as described, the object of forming the portion O' with the series of orifices $j$, leading from the circular channel $i$, is to lessen the pressure against the face of said portion O' and also against the springs $k$ and make the latter effective in holding said portion in proper relation with the other part of the valve.

As before stated, Figs. 13 and 14 represent a modification in the construction of the two portions of the valve. In these figures the part $O^2$ is formed with openings or orifices $n$, leading direct to the steam-pipes N or the conduits K, as the case may be, (and as will be more fully explained hereinafter,) and the portion $O^3$ instead of being formed with the circular channel $i$ and orifices $j$, as shown at Fig. 6, is formed with two semicircular channels $o\ o'$, separated at their adjacent ends by a solid partition, and one end of each of said channels connected by diametric orifices $p$ with the steam-pipes Q Q', respectively, so that as long as one of the orifices $n$ of the portion $O^2$ of the valve is in communication with the semicircular channel o of the part O³ live steam is free to pass from the pipe Q and through the port a to the cylinder F behind the piston-head L, and when said orifice n has passed beyond the end of the channel o' and the steam is cut off the next orifice n will have communicated with said channel o', so that steam may be supplied to the second or succeeding cylinder in the same manner as just described, while at the same time the first or advance orifice n will have registered with the upper end of the second semicircular channel o', and the steam from the advance cylinder is exhausted through the channel o' and pipe Q', as indicated by the arrows in the diagrammatic view, Fig. 10, and so on successively. It will be seen from this described construction that as the entrance of the live steam is transferred from the pipe Q to the pipe Q' through the medium of the valve S, as heretofore described, it will necessarily result in reversing the movement of the engine.

The valve S and its connections for reversing the engine are used only in connection with the modified construction shown at Fig. 11 and in which the steam-pipes N communicate directly with the ports a in the cylinders F; but in the construction shown at Fig. 2 a double-headed piston-valve q q is employed in connection with the open-ended conduit K, the steam-pipes N in this case communicating with said conduit at a point just above the limit of upward movement of the lower head of the piston-valve, as clearly shown, so that the live steam is always admitted between the two heads of the said piston-valve, as is well understood, and when said valve is drawn down its upper head will occupy a position below the outer end of the cylinder-port a, and consequently the dead steam from said piston may in an obvious manner be exhausted through the port a directly out the open end of the conduit K and into the condensing-case or muffle-box Y. The necessary reciprocation of the valve-heads q q to produce this result is accomplished through the medium of piston-rods r, pivotally connected with a ring or strap Z, embracing and movable around an eccentric A', the rotation of the engine, and consequently the strap Z, around the eccentric A' producing the necessary movement of the valve-pistons r. The eccentric A' is formed with a dovetail B' and a central elongated opening C', through which the fixed crank-shaft C passes, and the dovetail portion B' of the eccentric is mounted in a correspondingly-grooved support secured to the pillar B. The eccentric is connected by a link-rod D' with an operating-lever E', pivoted to a segmental rack F', and is provided with a suitable spring-latch G'. (See Figs. 1 and 4.) It will be seen from the construction described that through the medium of the lever E' and the consequent movement of the eccentric A' and its surrounding strap Z the movement of the engine may be reversed.

I will now proceed to describe how the engine and its connections are caused to rotate around the crank-shaft C. The shaft being stationary, as described, and the piston-rods M being connected with the crank portion of said shaft, the steam as it enters the ends of the cylinders F successively forces the respective piston-heads L toward the crank, and by reason of the connection between the piston-rods and the crank portion of the shaft, which of necessity is eccentric to the axis of motion of the engine, the pushing action of the crank causes in an obvious manner the rotation of the engine, and after each pushing action of the crank to produce rotation of the engine, and as the steam in the successive cylinders ceases to have any effect, said cylinder during its continued rotative movement approaches the fixed crank, and the latter operates to push the piston progressively back to its original operative position and at the same time exhausts the dead steam. When the boiler-pressure of the steam in each cylinder is successively cut off by the rotation of the portion O of the valve (which is coincident with the admission of steam to the next succeeding cylinder) and until the piston is reversely reciprocated to exhaust said cylinder, the body of steam within the cylinder operates expansively to complete the stroke of the piston. The portion O of the valve moving, as of necessity it must, with the engine the supply of steam is controlled, as hereinbefore fully described. In order to utilize the power exerted by the rotary movement of the engine, a sprocket-wheel G, from which power may be transmitted in an obvious manner, is rigidly secured to the tubular hub or sleeve projection of the rotating portion O' of the valve, as clearly shown at Figs. 1, 2, and 11. As the portion O' of the valve is connected with the steam-pipes Q Q' they are formed with a suitable flexible joint at any desired locality to compensate for any sliding or wabbling movement of said valve portion.

While I have shown the construction involving three cylinders and pistons, it will be understood that I may use a greater number, if desired, and in which case the valve construction would accordingly change to meet such condition, said change being only such as would be obviously required to supply the steam to the increased number of cylinders and to exhaust the same in substantially the same manner as shown and described with reference to the three-cylinder construction. Many other changes may be made in the mere details of construction without departing from the spirit of my invention.

Having described the construction and operation of my improved engine, what I claim as new, and desire to secure by Letters Patent, is—

1. In an engine such as described, in combination with the multicylinders revolubly mounted upon a fixed shaft having a central crank portion, said cylinders provided with ports $a$ communicating with steam-conduits leading to a steam-supply valve mounted upon the fixed shaft, reciprocating pistons within the cylinders and revolubly connected with the crank portion of the fixed shaft, piston-valves $q$, $q$, an eccentric A', strap Z, rod D' and operating-lever E', substantially as and for the purposes set forth.

2. In an engine, the combination of pillars B, a continuous fixed shaft mounted upon said pillars and formed with a central crank portion D, a series of radiating cylinders rigidly connected with a central hub revolubly mounted upon the fixed shaft, reciprocating pistons within the cylinders and having the piston-rods thereof rotatively connected directly to the central crank portion of the fixed shaft, steam-ports at the outer ends of the cylinders, conduits from said ports, and a supply-valve connected with said conduits and mounted upon one end of the fixed shaft and automatically and longitudinally adjustable thereon, substantially as and for the purposes described.

3. In combination with the radiating cylinders rotatively mounted upon a fixed crank-shaft and provided with reciprocating pistons having their piston-rods rotatively connected with the crank portion of the fixed shaft, ports leading from the outer ends of the cylinders to steam-conduits, connected with a two-part supply-valve mounted upon one end of the fixed shaft, one portion of said valve being connected rigidly with the hub of the cylinders and rotative therewith upon the shaft, and the other portion capable of longitudinal adjustment upon the fixed shaft, substantially as and for the purposes set forth.

4. The supply-valve mounted upon one end of the continuous fixed shaft, one portion of said valve being fixed to the hub of the radiating cylinders and communicating with the steam-conduits leading to the ports in said cylinders, and the other portion of said valve adapted to longitudinal adjustment upon the fixed shaft, and yielding pressure devices mounted upon the fixed shaft for holding said valve portion in proper adjustment with the rotating portion of the valve, substantially as hereinbefore set forth.

5. The valve composed of the two parts O, O', the part O formed with circular channel $g$ and ports $h$, and the part O' formed with circular channel $i$, intersecting orifices $j$, and trunnions $f$, in combination with springs $k$, equalizing-bar X, and means for securing the springs and bar in position substantially as and for the purpose set forth.

6. In an engine such as described and with cylinders radiating from a hub G, mounted upon a fixed shaft and having one portion of a supply-valve secured thereto, said hub reduced and extended through the second or longitudinally-adjustable portion of the supply and exhaust valve, and having secured upon its projecting end a sprocket-wheel or other means for transmitting power, substantially as hereinbefore set forth.

7. The valve composed of the two parts O, O', the part O formed with a circular channel $g$ and ports $h$, and the part O' formed with a circular channel $i$ and transverse intersecting orifices $j$, substantially as and for the purposes set forth.

In testimony whereof I affix my signature in presence of two witnesses.

WM. SCANTLEBURY, Senr.

Witnesses:
 JOHN C. LANG,
 R. B. RIVES.